United States Patent [19]

Chawan et al.

[11] Patent Number: 5,395,639
[45] Date of Patent: Mar. 7, 1995

[54] MILLING PROCEDURE FOR THE MANUFACTURE OF ALIMENTARY PASTE AND PASTA PRODUCTS FROM WHOLE GRAINS

[75] Inventors: Dhyaneshwar B. Chawan; Edward A. Matuszak, both of Liverpool; Leslie H. Volles, Syracuse, all of N.Y.

[73] Assignee: Borden, Inc., Columbus, Ohio

[21] Appl. No.: 965,471

[22] Filed: Oct. 23, 1992

[51] Int. Cl.⁶ .......................... A23L 1/16; A23L 1/172
[52] U.S. Cl. .................................... 426/557; 426/451; 426/622
[58] Field of Search .................. 426/622, 557, 451

[56] References Cited

U.S. PATENT DOCUMENTS

| | | | |
|---|---|---|---|
| 327,250 | 9/1885 | Foulds | 426/622 |
| 1,013,453 | 1/1912 | Shepard | 426/622 |
| 1,299,819 | 4/1919 | Bouchet | 426/557 |
| 1,570,443 | 1/1926 | McSorley | 426/557 |
| 2,745,748 | 5/1956 | McCashen | 426/622 |
| 2,819,969 | 1/1958 | Grandel | 426/622 |
| 4,986,997 | 1/1991 | Posner | 426/622 |
| 5,066,506 | 11/1991 | Creighton | 426/622 |

OTHER PUBLICATIONS

I Hylnka, Wheat Chemistry and Technology, 1964 American Association of Cereal Chemists, Inc. St. Paul, Minn., pp. 540–541.

Dr. Ch. Hummel, Macaroni Products Manufacture, Processing and Packing, 1966 Food Trade Press, Ltd. London, pp. 196–197.

Primary Examiner—Donald E. Czaja
Assistant Examiner—Mary S. Mims
Attorney, Agent, or Firm—Stevens, Davis, Miller & Mosher

[57] ABSTRACT

A process is presented for minimizing oxidative degradation of whole wheat flour in the production of whole wheat pasta. A sweet nutty flavor is preserved and off-flavors are avoided by whole milling without removing the germ, not fine grinding the wheat, and immediately mixing the freshly-ground whole wheat flour with water to produce a dough or alimentary paste. This minimizes the exposure of oils and other components to enzymatic and other degradative processes.

6 Claims, No Drawings

MILLING PROCEDURE FOR THE MANUFACTURE OF ALIMENTARY PASTE AND PASTA PRODUCTS FROM WHOLE GRAINS

FIELD OF THE INVENTION

The invention relates to a process for milling wheat grain into flour for use in pasta production, whereby the flour has less bitterness and longer shelf life than flour milled conventionally.

BACKGROUND OF THE INVENTION

Whole durum flour is commercially available and is used to manufacture and market whole wheat pasta products. Graham flour, like conventional whole wheat flour, is made by combining all, or most of the mill streams to give a product containing substantially all of the constituents of wheat as they exist in the intact berry or grain. However, excessive grinding renders the flour extremely subject to the development of rancidity and susceptible to insect infestation. Thus, a significant disadvantage of conventional whole grain milling of wheat is the resultant enzymatic attack on the wheat components, for example, the wheat germ. Finely milling whole wheat subjects the enzymes present in or on the germ to sufficient oxygen to facilitate rapid and significant enzymatic/oxidative degradation of the germ. This produces undesirable flavor changes, and a result often referred to as a hay-like flavor. Products such as pasta produced from degraded germ often reflect this undesirable hay-like flavor. In addition, such pasta products exhibit a texture which is coarse and grainy, and cooked pasta has bitter after taste.

U.S. Pat. No. 327,250, issued Sep. 29, 1885 to Foulds, discloses an improved wheat meal product comprising a mixture of coarse ground wheat germ and berry constituents. The wheat is cracked so that the germ is not crushed, but the germ is separated from the other milled wheat fractions. The non-germ fractions are milled to a fine meal, then the germ is added back to the finely ground meal.

U.S. Pat. No. 1,013,453, issued Jan. 2, 1912 to Shepard, discloses a method for preparing white wheat in a coarse manner with much of the bran and other rough parts of the grain retained. The wheat is soaked, washed, then dried rapidly at a high temperature, and progressively milled. This process causes the bran layers to stick to the endosperm portion of the wheat due to the specialized milling. As a result, the wheat is subjected to more of a cutting action than a conventional milling action.

U.S. Pat. No. 2,745,748, issued May 15, 1956 to McCashen, discloses a method of making a cereal flour wherein a type of coarse milling is achieved by centrifugal separation and impact of the germ upon the side walls of the mill. This is performed in such a way that the oil-containing cells are not ruptured, but rather are separated out. However, the resulting meal or flour is of uniformly fine mesh (40 to 60 mesh) and would therefore not be acceptable as a whole wheat flour which is characterized as larger pieces.

U.S. Pat. No. 2,819,969, issued Jan. 14, 1958 to Grandel, teaches the nutritional advantages and process disadvantages of producing wheat flour with a high germ content in the production of pasta. Germ from cereal grains such as wheat, rice, or corn are partially or fully defatted, heat treated and added to semolina.

U.S. Pat. No. 4,986,997, issued Jan. 22, 1991 to Posner, et al., teaches the advantages of germ removal from the wheat flour. The wheat is tempered and impact treated in such a way that intact germ is separated.

U.S. Pat. No. 5,066,506, issued Nov. 19, 1991 to Creighton, et al., teaches a process for inactivating the enzymes in the germ. The high temperature (260° to 315° C.) used in the process of Creighton, et al. would have a negative effect on protein functionality. As a result, pasta made from this process would be of poor quality.

Accordingly, there is a need for a simple and inexpensive process to provide pasta products prepared from milled whole grain wheat, wherein the whole grain wheat does not suffer from oxidative degradation of the germ component. Also needed in the art is an economic process for the preparation of milled wheat which does not require the separation of the germ from the other components, or a defatting of the germ.

SUMMARY OF THE INVENTION

According to one embodiment of the present invention, whole wheat is milled to a coarse granulation. Wheat useful in the present invention is preferably Durum wheat, however, other wheats are operative including, but not limited to, Hard Red Spring, Red Durum, Hard Red Winter, Soft Red Winter, White, and Mixed Wheat, equivalents thereof and mixtures thereof. By "equivalents" herein is meant novel strains or hybrids of wheat useful as replacements for the wheat types named herein.

According to the present invention, the coarsely-ground or milled whole wheat is then promptly combined with sufficient liquid to make a dough, which is extruded, cut to desired lengths and dried. A preferred liquid herein is water. By coarse milling rather than fine milling the wheat, the process of the present invention prevents disintegration of the wheat germ. Coarse milling also reduces or eliminates enzymatic oxidative deterioration in the finished product often detected as bitterness. In addition coarse milling results in less surface area exposure to atmospheric oxygen, thus minimizing oxidation/bitterness development in the finished product. Also by prompt, and preferably immediate, mixing of the milled wheat with liquid to make dough, the exposure of the ground wheat to oxidation is minimized. The dough is extruded into different pasta shapes and dried above 70° C. which inactivates the enzymes causing oxidation and bitterness. As a result, a sweet, nut-like flavor inherent in the wheat germ is preserved in the process of the present invention, and maintained into the final pasta product without the introduction of off-flavors or bitterness due to oxidative degradation.

By "pasta" herein is meant macaroni products, noodle products, spaghetti products, vermicelli products and the like, regardless of size, length or shape, or addition of additives (such as whole eggs or egg whites) or flavorants.

An advantage of the present invention is the utilization in a pasta product of a complete whole wheat, wherein all the components, including the germ, are stabilized and retained in the finished product. This provides nutritional enhancement to the consumer, and cost reduction and increased product yield to the producer. Conventional procedures often add defatted and/or toasted wheat germ to a milled wheat product which has previously had the germ removed or oxidatively destroyed. Such supplemental additions are not necessary according to the present invention because the wheat germ is never removed.

DETAILED DESCRIPTION OF THE INVENTION

It is an object of the present invention to provide a process for the preparation of shelf stable whole wheat flour comprising milling whole wheat to a coarse whole wheat flour preferably with particle size generally larger than U.S. #60 mesh wherein the wheat germ is not separated from the other wheat components, and wherein the wheat germ is preserved intact, whereby the coarse milled whole wheat flour thus produced exhibits a non-refrigerated shelf life of greater than one year, without an added preservative, as measured by absence of bitterness. The milled whole wheat flour is promptly, preferably immediately, mixed with water to produce a dough or alimentary paste. It has been discovered herein that the more rapidly the coarsely-ground whole wheat four can be mixed with water to form a dough, the better will be the inhibition of oxidative degradation. Thus, mixing the coarsely ground flour with water within 24 hours of milling is preferred. More preferred is the mixing of the flour and water within one hour of coarse milling. In the best mode known to the inventor, the coarsely milled flour is mixed with water within five minutes of milling. As a result, vastly improved pasta based on lack of bitterness is produced relative to pasta made from flour milled days or weeks prior to dough formation.

In the process of the present invention, the germ of the wheat remains intact and is not separated from the other components or fractions of the wheat. Rather, the whole grain is coarse milled and without conventional tempering. Tempering is conventionally used to dampen and heat the grain to make the outer bran layers flexible and less apt to break up during grinding. Since the present invention does not grind the wheat finely, and break up is avoided, tempering can be eliminated.

In a preferred embodiment of the present invention, whole wheat kernels are coarse milled allowing the germ to stay intact. By "intact" herein is meant wholly retained and at least substantially or essentially remaining intact but reduced in particle size. In conventional milling, the aim is to separate the endosperm from the bran and germ and grind it into a fine powder. The more efficient the conventional milling process, the less bran and germ is mixed with the finished flour. By contrast, the present invention retains all the wheat components including the bran and the germ with the finished coarse milled whole wheat flour. This coarse milled whole wheat flour has a sweet, nut-like flavor.

According to one embodiment of the present invention, and not by limitation, the whole wheat is coarse milled on so-called break rolls. Excessive grinding, milling, breaking, fragmentation or reduction is avoided. Thus, it is particularly preferred in the present invention that the wheat be milled to a granulation wherein greater than 90% of the coarse milled whole wheat product is retained on U.S. #60 mesh. The coarser the milling, the more nut flavor retention is achieved, and enzymatic degradation is avoided. However, particle sizes greater than about #10 mesh are generally considered undesirable for use in pasta products because of grittiness or grainy texture in the final product and difficulty in extrusion processing, including equipment wear. Therefore, a preferred grain or particle size in the coarse milled whole wheat flour according to the process of the present invention is from about 20 to about 100 mesh.

Milling can be achieved, for example, by opening the bit or space between conventional two-roll mills to produce the desired particle size.

By the present invention, grinding and hydrating the resulting flour in close proximity to the dough mixer not only reduces exposure of flour to oxidation conditions, but coordinates the milling, mixing and extrusion steps into one location or production site. It is preferable that the time period between grinding and mixing be minimized to less than ten minutes, and more preferably to less than five minutes.

One advantage of the present invention is that while additives such as preservatives can be added, they are less necessary than in conventional milling. Wheat which is conventionally milled then shipped to a mixer produces flour more susceptible to enzymatic oxidation degradation and thus antioxidant additives are usually needed.

Another advantage of the present invention is the long shelf life obtained for the coarsely milled wheat, relative to conventional finely milled wheat, as evidenced by a lack of bitterness. By the present invention, non-refrigerated shelf life of the coarse milled wheat in excess of one year is obtained and in the absence of common antioxidant or preservative additives, such as ascorbic acid or potassium bromate. This shelf life advantage without additives will have significant impact on the cost reduction and profitability of the final whole wheat pasta products.

Still another advantage of the milling process of the present invention is the elimination of a waste stream or low value by-products since 100% of the wheat kernel is retained and utilized in the pasta dough. This improves the profitability of the final pasta product because all of the wheat is going into high value food for human consumption, rather than a fraction of the milled product being directed to lower value animal feed. Profitability is also improved by reducing the costs of waste steam treatment and other environmental expenses.

The coarse milled whole wheat is then promptly, preferably immediately, combined with liquid, such as water, to produce a dough or alimentary paste. The preferred liquid or moisture content is from about 32% to 39% by weight, more preferably about 33% by weight, but can be as low as 30% or as high as 40%. The mixing of the coarsely-milled wheat with the liquid can include other additives and agents useful or desirable in achieving preferred tastes, textures, processing viscosities, shelf life, etc.

Important functions of the dough mixer are the blending of the coarsely milled wheat and the liquid, plus any additives, and also the development of the gluten. The hydration of the wheat flour, or hydration of the gluten proteins therein, is a precursor to the dough development process. It is known that the hydration of the gluten proteins occurs rapidly and does not vary a great deal between flours, while dough development is relatively slow and requires the input of a considerable amount of force. The mixing response of a flour is, to a large extent, determined by the amount and quality of the gluten. By the present invention, it is discovered that coarsely ground wheat provides coarse whole wheat flour which can readily exhibit in the dough mixer sufficient hydration of the gluten and development of the dough in mixing times significantly less than conventional mixing times. Furthermore, by the present invention, the mixing temperature of the whole wheat dough within the mixer can be, for example, 7.0° C. to 21° C., instead of the conventional temperatures of 25° C. to 30° C. These improved conditions minimize oxidative degradation which causes undesirable flavor changes (bitterness) and also saves the producer time and money relative to conventional mixing of wheat flour into dough.

The dough or paste produced in the pasta dough mixer is then extruded, cut into pasta and dried using techniques known to those skilled in the art. By "extruded" herein is also meant sheeted, rolled, pressed, stamped, and the like.

Drying the pasta is preferably at high temperatures, i.e., 70° C. or higher for a time sufficient to reduce the moisture content of the pasta to about 12% by weight or below. It is preferred that the temperature of the drying not exceed 110° C. so that degradation of the protein within the pasta is avoided. During this high temperature drying of the pasta, the enzymes from the germ are inactivated, thus further preventing bitter or rancid flavor production. The drying of the extruded pasta can be achieved in conventional high temperature drying towers or ovens using equipment and techniques known to those skilled in the art. A particularly effective and preferred drying procedure is 70° C./10 hours at 85% RH.

In one embodiment of the present invention, a coarse grinder is mounted or positioned close to or on top of the pasta dough mixer so as to minimize the time lag between the coarse milling of the whole wheat and the dough formation. Such close proximity of the coarse grinder and the dough mixer also reduces the exposure of the milled wheat to oxidation conditions caused by contact of the dough with the oxygen in the air. The exclusion of air helps reduce or eliminate aerobic enzymatic degradation of the germ which can lead to bitter or hay-like flavor in the final product. Thus, flushing the grinder and/or mixer with an inert gas to reduce the amount of oxygen present is also useful herein.

Thus, in the present invention, the germ is not separated out or added back later. Also, soaking, washing, and tempering are not required. The wheat kernel is not cut or finely ground, and the germ is not defatted or processed by further procedures. In this manner, the wheat lipids located largely in the germ and consisting of fatty oils, phosphatides and unsaponifiable material, are retained into the final product. More importantly, by the present invention the wheat lipids are shielded from excessive oxidation or enzymatic attack and degradation. The unsaponifiable fraction of the wheat germ oil is particularly high in tocopherols which possess vitamin E activity. The fatty oils consist mostly of glycerides of oleic and linoleic acids and are retained in their original concentration by weight of the wheat. These materials, being shielded from oxidative degradation, are believed to provide the desirable sweet, nut-like flavor in the flour produced by the present invention.

In addition, the germ contains about 15% of the total thiamine of the wheat, and has also the richest concentration of riboflavin in the wheat. Thus, by conventional milling, most of the riboflavin and much of the thiamine are removed by milling. The present invention retains and preserves these nutritional components.

In one embodiment of the present invention, Durum wheat obtained from ConAgra, (10–12% by weight moisture) is milled in a hammer mill to a coarse flour granulation of, for example, +90% retained on U.S. #60 mesh. Water is then immediately added without transfer or otherwise agitating or aerating the flour to achieve a moisture level of up to 30% by weight in a dough. The dough is mixed in a mixer such as, for example, a pasta extruder mixer, available from Hobart, attached to the mill. The dough is extruded through a desirable orifice or nip, cut to a desired length, and dried at a temperature equal to or greater than about 70° Centigrade, but preferably less than about 100° Centigrade, for a minimum of about three hours or until a desired moisture content is attained. In this manner, the germ is maintained whole and retained in the milled wheat, and hence, into the dough, and the coarse milled flour is not allowed to age sufficiently to suffer oxidative degradation.

Pasta produced by the process of the present invention is unique and bears a surprising and pleasant taste. The taste-enhancing components, such as the fatty oils, which would by conventional methods be removed in defatting procedures or degradation by enzymatic oxidation, are preserved in the pasta products of this invention. A sweet, nut-like flavor not obtained in conventionally fine-milled wheat pasta is a hallmark of this invention. Further, the pasta products of this invention do not exhibit the bitterness or the hay-like flavor often found in conventional whole wheat pasta.

That which is claimed is:
1. A process to produce improved whole wheat pasta comprising:
   (a) milling whole wheat to a coarse whole wheat flour, wherein greater than 90% of the coarse milled whole wheat has particle size above U.S. #60 mesh size, wherein the wheat germ is not separated from the other wheat components, and wherein the wheat germ is preserved intact, whereby the coarse milled whole wheat flour thus produced exhibits a non-refrigerated shelf life of greater than one year, without an added preservative, as measured by absence of bitterness;
   (b) promptly combining the coarsely milled whole wheat flour from step (a) with sufficient liquid to produce an alimentary whole wheat paste or dough within a time period sufficiently short as to reduce the exposure of the flour to oxygen;
   (c) extruding the whole wheat dough from step (b) to produce a desired pasta shape and length; and
   (d) drying the whole wheat pasta of step (c) at a temperature greater than 70° Celsius, whereby a whole wheat pasta product is obtained which has a sweet, nutlike flavor relative to pasta products from finely milled, aged, whole wheat flour.

2. A whole wheat pasta product produced by the process of claim 1.

3. The process of claim 1 wherein the time period of step (b) is less than one day.

4. The process of claim 1 wherein the time period of step (b) is less than one hour.

5. The process of claim 1 wherein the time period of step (b) is less than five minutes.

6. The process of claim 1 wherein the water and flour are combined in step (b) at a temperature of from 7° C. to 25° C.

* * * * *